United States Patent
Horning et al.

[11] Patent Number: 6,097,890
[45] Date of Patent: Aug. 1, 2000

[54] ONE-TIME-USE CAMERA WITH FRACTURE LINE OF WEAKNESS NON-COINCIDENT TO PIVOT AXIS OF FILM DOOR

[75] Inventors: Randy E. Horning, Leroy; Dennis J. O'Dea, Farmington, both of N.Y.

[73] Assignee: Eastman Kodak Company, Rochester, N.Y.

[21] Appl. No.: 09/234,603

[22] Filed: Jan. 21, 1999

[51] Int. Cl.[7] .................................................. G03B 17/02
[52] U.S. Cl. ............................... 396/6; 396/535; 396/538
[58] Field of Search ................................. 396/6, 439, 440, 396/535, 538, 541; 229/242; 220/265, 266; 206/807

[56] References Cited

U.S. PATENT DOCUMENTS

| 554,769 | 2/1896 | Brownell | 242/118.62 |
|---|---|---|---|
| 579,949 | 4/1897 | Brownell | 396/385 |
| 1,050,785 | 1/1913 | Austin et al. | 242/118.4 |
| 1,144,267 | 6/1915 | VanSickle et al. | 396/502 |
| 3,800,999 | 4/1974 | Serritella | 229/242 |
| 4,991,786 | 2/1991 | Cloutier et al. | 242/348.3 |
| 5,063,400 | 11/1991 | Takei et al. | 396/6 |
| 5,202,713 | 4/1993 | Nakai et al. | 396/6 |
| 5,329,330 | 7/1994 | Sakai et al. | 396/6 |
| 5,349,410 | 9/1994 | Kamata | 396/6 |
| 5,359,168 | 10/1994 | Cunningham | 200/61.08 |
| 5,453,804 | 9/1995 | Norris et al. | 396/31 |
| 5,517,270 | 5/1996 | Balling | 356/536 |
| 5,550,608 | 8/1996 | Smart et al. | 396/538 |
| 5,579,070 | 11/1996 | Smart et al. | 396/538 |
| 5,581,316 | 12/1996 | Kamoda et al. | 396/6 |
| 5,581,321 | 12/1996 | Boyd | 396/535 |
| 5,608,485 | 3/1997 | Kataoka et al. | 356/514 |
| 5,682,570 | 10/1997 | Wakabayashi | 396/536 |
| 5,689,745 | 11/1997 | Zander et al. | 396/429 |
| 5,761,542 | 6/1998 | Lamphron et al. | 396/6 |
| 5,815,740 | 9/1998 | Wagner | 396/6 |
| 5,918,076 | 6/1999 | Solomon et al. | 396/6 |

*Primary Examiner*—Eddie C. Lee
*Attorney, Agent, or Firm*—Roger A. Fields

[57] ABSTRACT

An opaque rear cover part for a one-time-use camera comprising a door cover portion and a remaining cover portion arranged to permit the door cover portion to be pivoted open relative to the remaining cover portion about a pivot axis, and a fracture line of weakness formed between the door cover portion and the remaining cover portion to create a break along the fracture line of weakness which permits the door cover portion to be separated from the remaining cover portion when the door cover portion is pivoted open, is characterized in that the fracture line of weakness is not coincident with the pivot axis in order to effect a shearing stress in addition to a bending stress at the fracture line of weakness, which causes the door cover portion to separate from the remaining cover portion when the door cover portion is pivoted open.

9 Claims, 8 Drawing Sheets

ONE-TIME-USE CAMERA WITH FRACTURE LINE OF WEAKNESS NON-COINCIDENT TO PIVOT AXIS OF FILM DOOR

CROSS REFERENCE TO RELATED APPLICATION

Reference is made to commonly assigned copending application Ser. No. 09/,234,763, entitled ONE-TIME-USE CAMERA WITH ANTI-BACKUP PAWL FOR FILM WINDER INCAPACITATED WHEN FILM DOOR OPENED TO REMOVE FILM CARTRIDGE and filed Jan. 21, 1999 in the names of Randy E. Homing, Raymond P. Chapman & James G. Rydelek.

FIELD OF THE INVENTION

The invention relates generally to the field of photography, and in particular to one-time-use cameras. More specifically, the invention relates to a one-time-use camera that is incapacitated to prevent its reuse when a film door is opened to remove a film cartridge.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

PRIOR ART PROBLEM

There is a problem in the recycling, i.e. reuse, of used camera parts, in that the reused parts may become worn or damaged. Thus, it has been suggested that any worn or damaged parts be purposely fractured to render them visibly different during disassembly of the one-time-use camera to retrieve the exposed film. This allows the worn or damaged parts to be readily identified to be discarded, and prevents them from being erroneously reused.

A possible solution to the problem of erroneously reused parts is disclosed in prior art U.S. Pat. No. 5,761,542 issued Jun. 2, 1998. In the patent, a fracture line of weakness or v-shaped groove divides a door cover portion of the rear cover part and a remaining cover portion of the rear cover part along a pivot axis of the door cover portion. The door cover portion is to be pivoted open relative to the remaining cover portion to remove the film cartridge from the cartridge receiving chamber. An anti-backup pawl is located in a slot that longitudinally extends between the door cover portion and the remaining cover portion. A fixed end of the anti-backup pawl is connected to the remaining cover portion at the fracture line of weakness and to the door cover portion adjacent the fracture line of weakness. A free end of the anti-backup pawl engages the thumbwheel. When the door cover portion is pivoted open relative to the remaining cover portion, a break is created along the fracture line of weakness which permits the door cover portion to be separated from the remaining cover portion in order to prevent the rear cover part from being reused. The anti-backup pawl is moved with the door cover portion to break the fixed end of the anti-backup pawl at the fracture line of weakness.

Since in the patent the fracture line of weakness is coincident with the pivot axis of the door cover portion, pivoting the door cover portion open subjects it only to bending (not shearing) stress. Thus, the door cover portion is not very easily separated from the remaining cover portion.

THE CROSS-REFERENCED APPLICATION

The cross-referenced application discloses an opaque rear cover part for a one-time-use camera comprising a door cover portion and a remaining cover portion that are connected to permit the door cover portion to be pivoted open relative to the remaining cover portion, a slot having opposite ends that longitudinally extends between the door cover portion and the remaining cover portion, and an anti-backup pawl supported in the slot for engaging a film winding thumbwheel that is to be located in the slot. The anti-backup pawl has respective connections with the door cover portion and the remaining cover portion that project between the opposite ends of the slot from the anti-backup pawl to the door cover portion and the remaining cover portion to support the anti-backup pawl in the slot. One of the connections is constructed to be torn apart when the door cover portion is pivoted open relative to the remaining cover portion in order that the anti-backup pawl will no longer be connected to the door cover portion or the remaining cover portion.

SUMMARY OF THE INVENTION

An opaque rear cover part for a one-time-use camera comprising a door cover portion and a remaining cover portion arranged to permit the door cover portion to be pivoted open relative to the remaining cover portion about a pivot axis, and a fracture line of weakness formed between the door cover portion and the remaining cover portion to create a break along the fracture line of weakness which permits the door cover portion to be separated from the remaining cover portion when the door cover portion is pivoted open, is characterized in that:

the fracture line of weakness is not coincident with the pivot axis in order to effect a shearing stress in addition to a bending stress at the fracture line of weakness, which causes the door cover portion to separate from the remaining cover portion when the door cover portion is pivoted open.

DETAILED DESCRIPTION OF THE INVENTION

Figure 1:
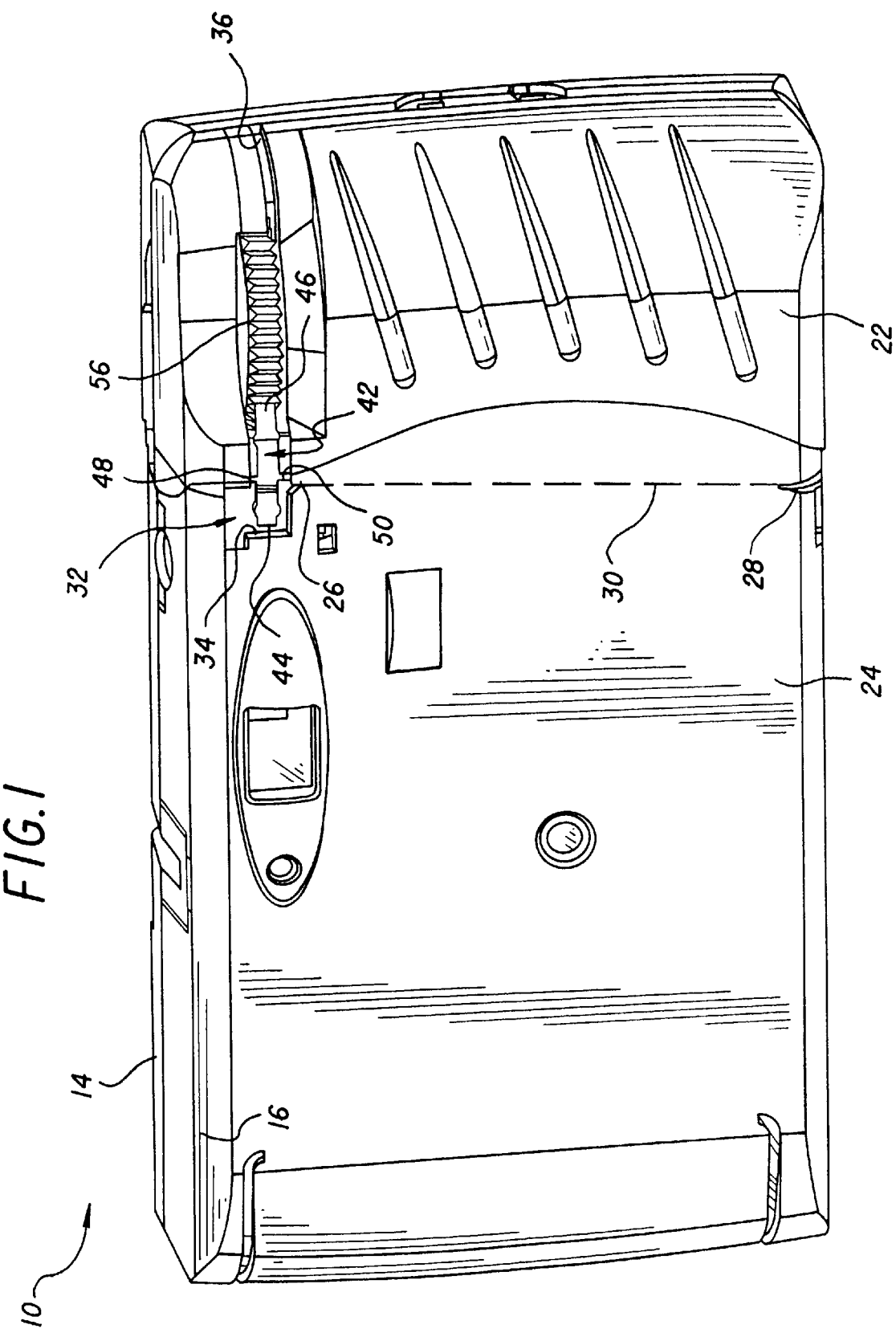
FIG. 1 is an exteior rear elevation view of a one-time-use camera.
Figure 2:
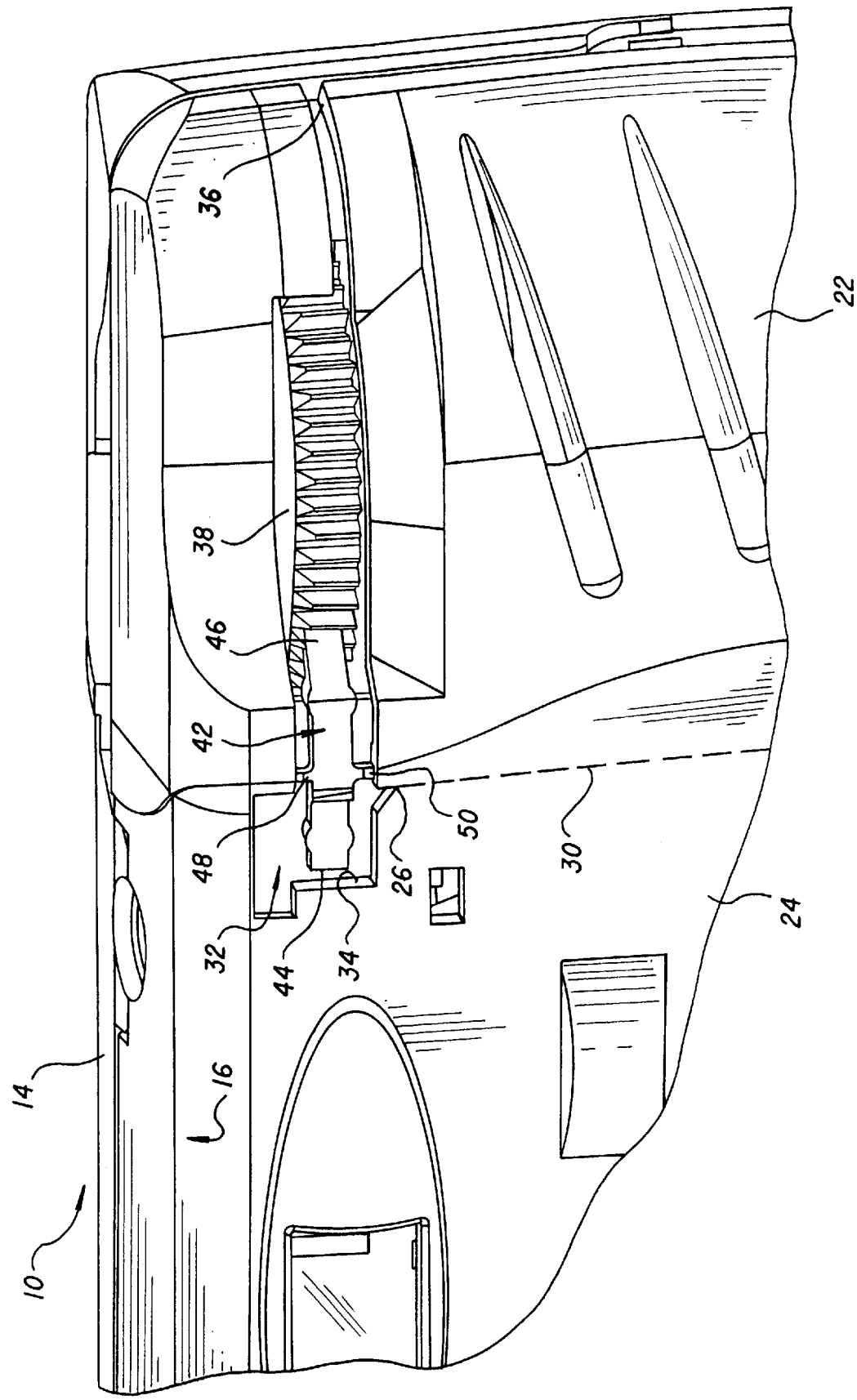
FIG. 2 is a blow-up of a portion of FIG. 1.
Figure 3:
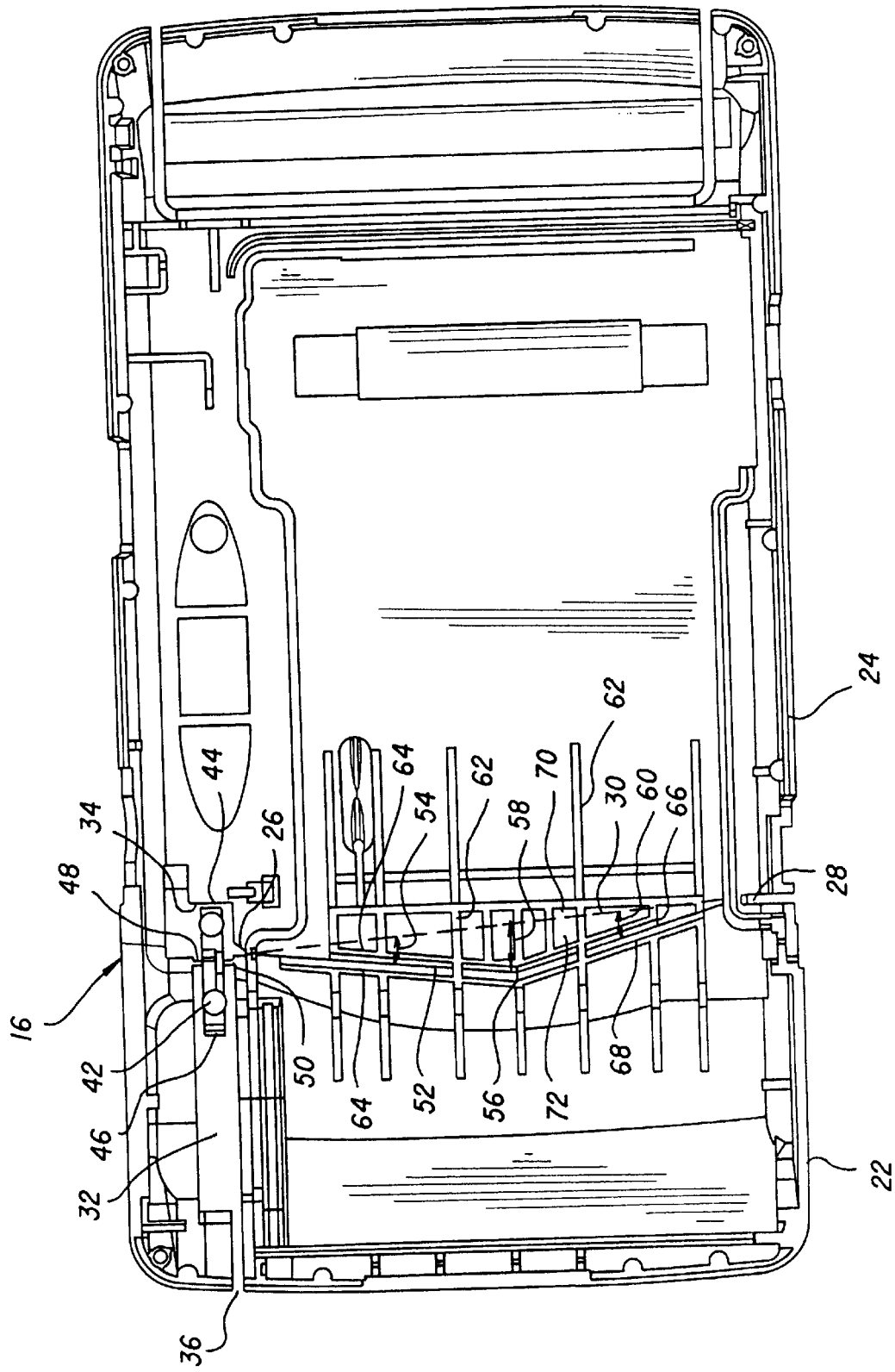
FIG. 3 is an interior elevation view of a rear cover part of the one-time-use camera.
Figure 4:
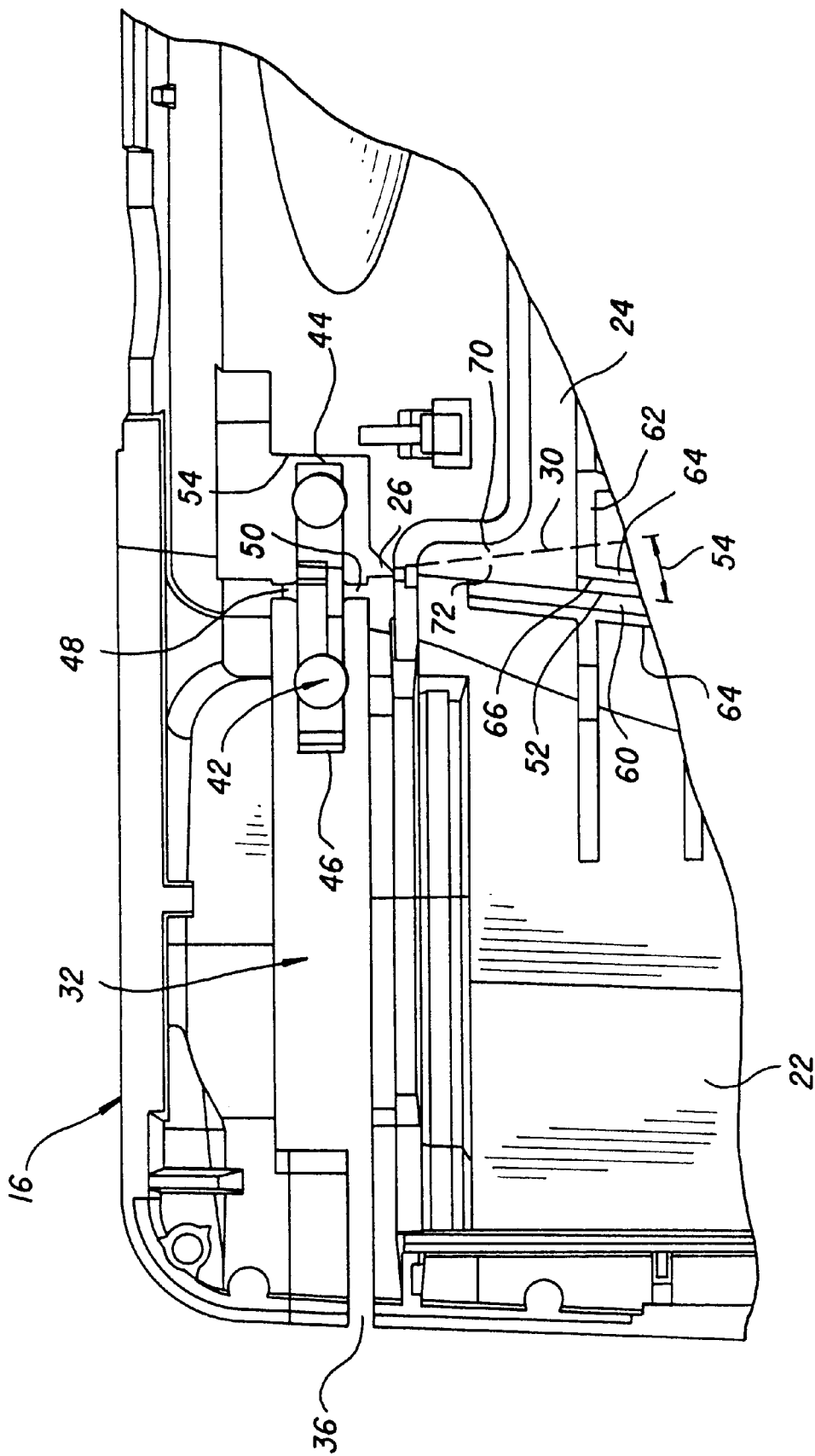
FIG. 4 is a blow-up of a portion of FIG. 1.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–8 show a one-time-use camera 10 which includes a plastic opaque main body part 12 and a pair of plastic opaque front and rear cover parts 14 and 16 which house the main body part between them.

As is known, the main body part 12 has a rearwardly open cartridge receiving chamber 18 for a film cartridge 20 and a rearwardly open film supply chamber (not shown) for an unexposed film roll. See FIG. 7. A backframe opening (not shown) is located between the cartridge receiving chamber 18 and the film supply chamber for exposing successive imaging sections of a filmstrip initially stored on the unexposed film roll.

The rear cover part 16 has a door cover portion 22 and a remaining cover portion 24. A pair of lead-in notches 26 and 28 in the rear cover portion 16 allow the door cover portion 22 to be pivoted open relative to the remaining cover portion 24 about a pivot axis 30, from the cartridge receiving chamber 18. See FIGS. 1, 3, 5 and 6. The door cover portion 22 is pivoted open to permit the film cartridge 20 to be removed from the cartridge receiving chamber 18.

A slot 32 in the rear cover part 16 has opposite ends 34 and 36 and longitudinally extends between the door cover portion 22 and the remaining cover portion 24. See FIGS. 1 and 2. A film winding thumbwheel 38, rotatably supported on the main body part 12, protrudes outwardly from the slot 32 and has a depending coaxial stem (not shown) in coaxial engagement with one end 40 of a film spool in the film cartridge 20. Manual winding rotation of the film winding thumbwheel 38 clockwise in FIG. 7 similarly rotates the film spool 40 to wind each exposed section of the filmstrip into the film cartridge 20.

Figure 5:
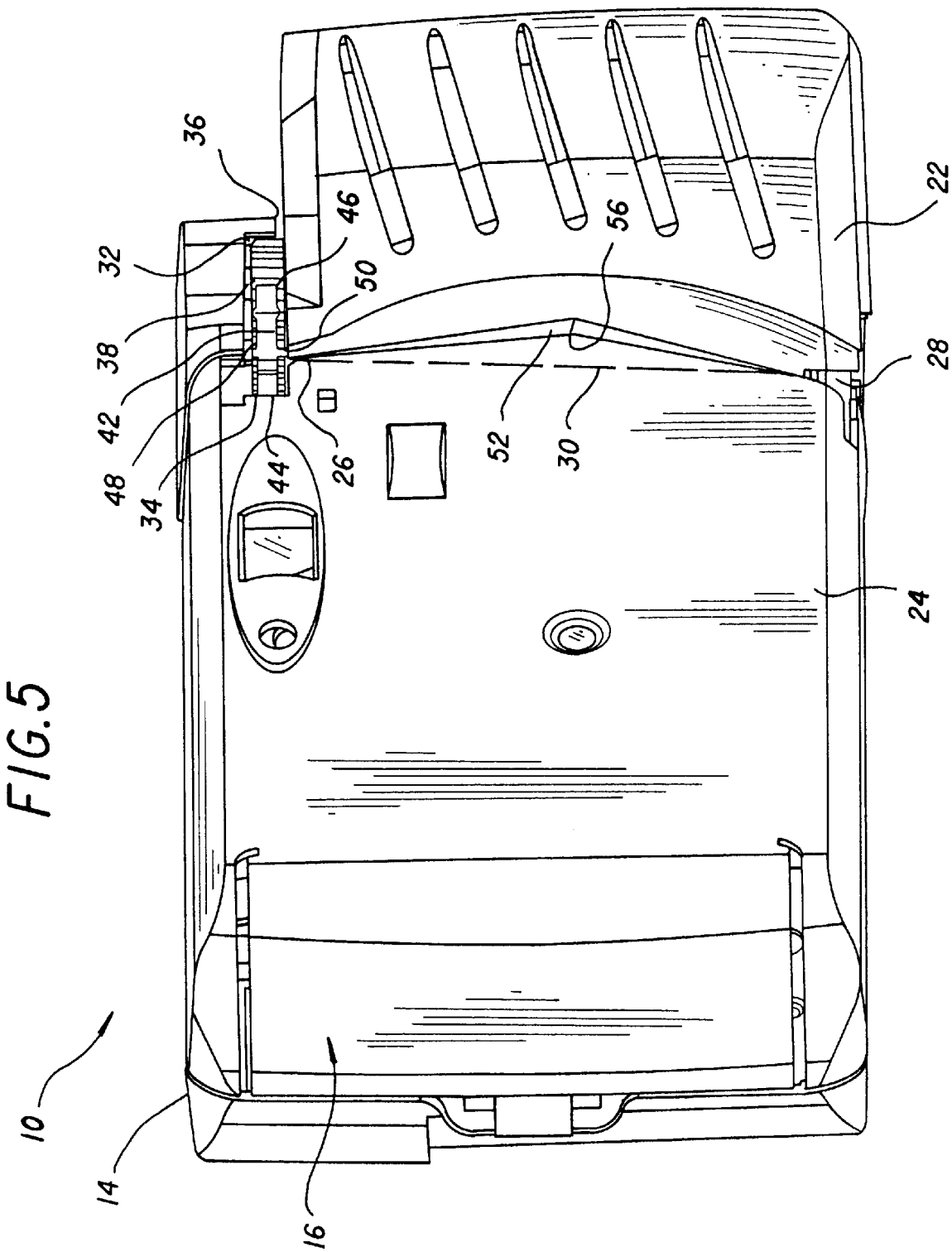
FIG. 5 is an exterior rear elevation view of the one-time-use camera, showing a door cover portion of the rear cover part pivoted open relative to a remaining cover portion of the rear cover part.
Figure 6:
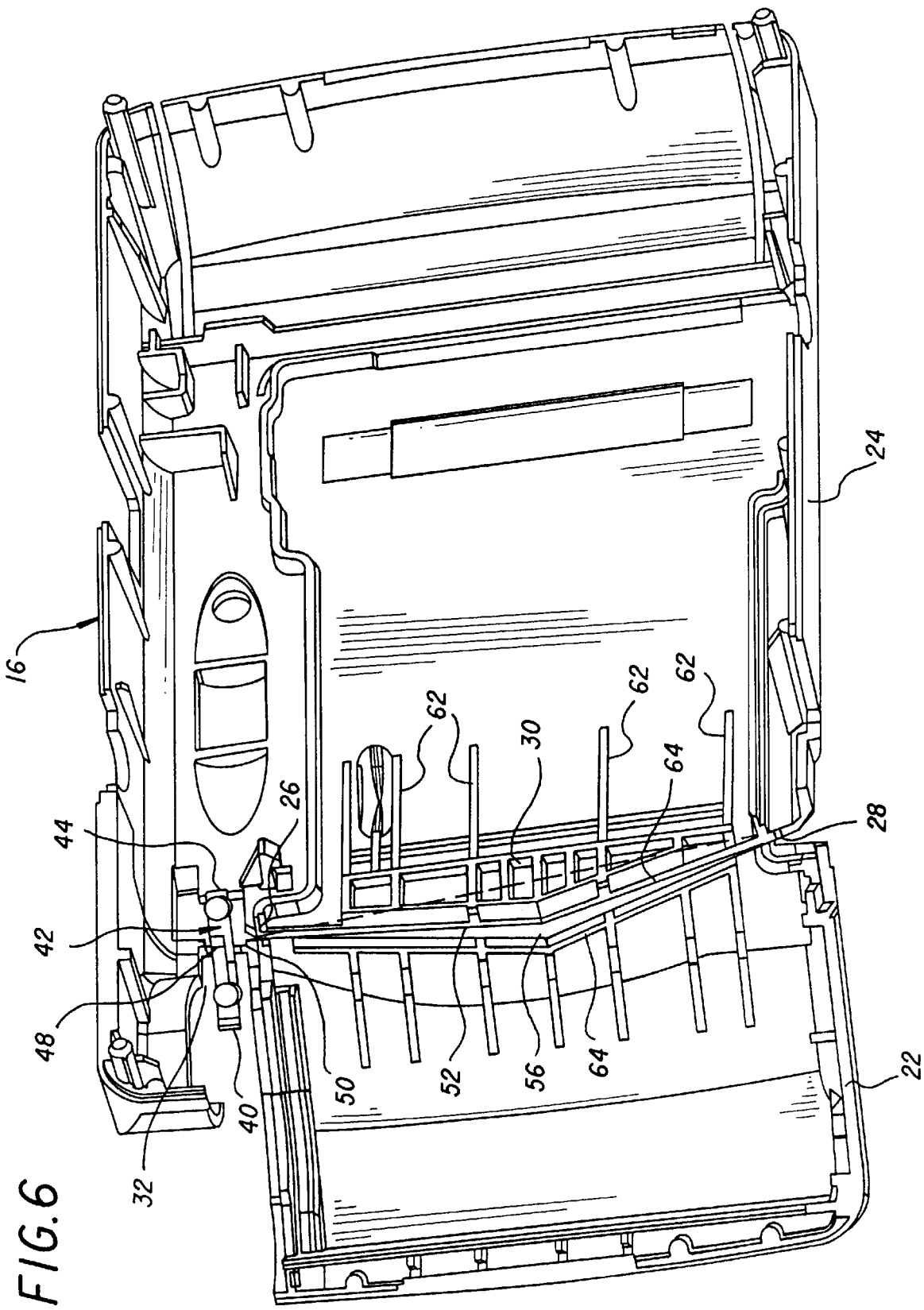
FIG. 6 is an interior elevation view of the rear cover part, showing the door cover portion pivoted open relative to the remaining cover portion as in FIG. 5.
Figure 7:
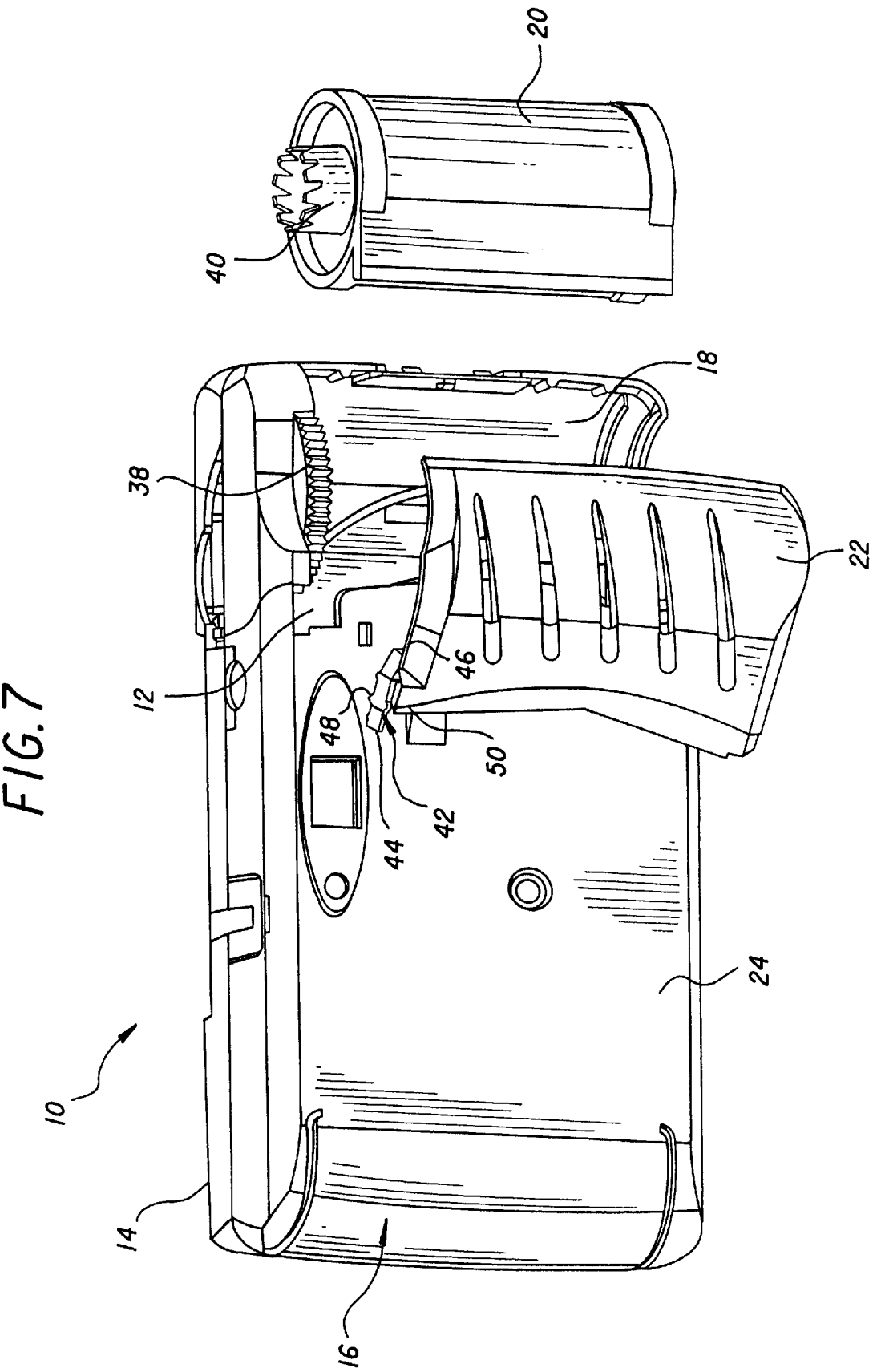
FIG. 7 is an exterior rear elevation view of the one-time-use camera, showing the door cover portion separated from the remaining cover portion.
Figure 8:
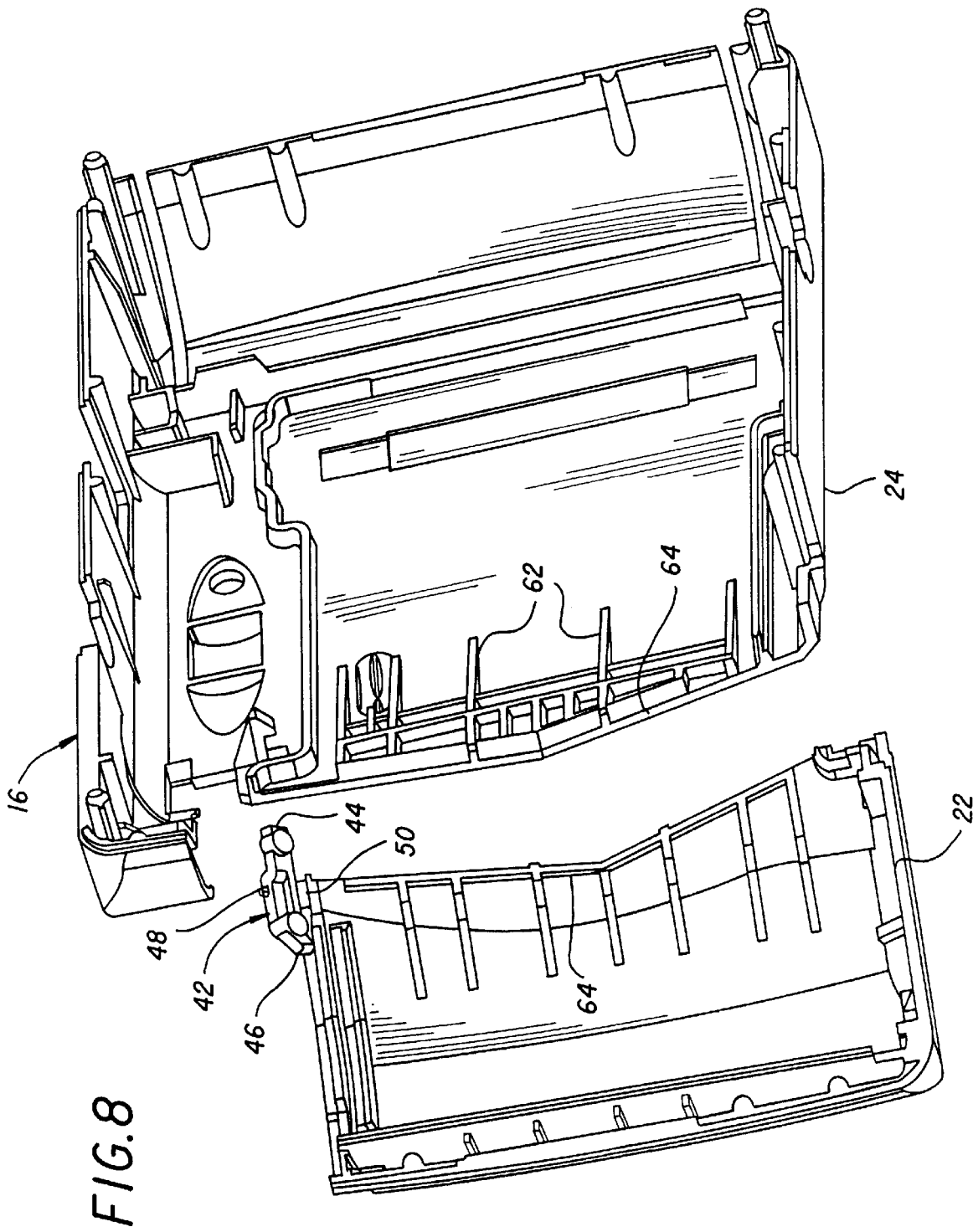
FIG. 8 is an interior elevation view of the rear cover part, showing the door cover portion separated from the remaining cover portion as in FIG. 7.

An anti-backup pawl 42 integrally formed with the rear cover part 16 has a pair of free ends 44 and 46 and respective thin flexible connections 48 and 50 to the door cover portion 22 and the remaining cover portion 24 that project in opposite directions between the free ends to support the anti-backup pawl in the slot 32. The free ends 44 and 46 of the anti-backup pawl 42 are each positioned in the slot 32 spaced from the opposite ends 34 and 36 of the slot. One of the free ends 44 and 46, i.e. the free end 46, engages the film winding thumbwheel 38 to prevent unwinding rotation of the thumbwheel counter-clockwise in FIG. 7. When the door cover portion 22 is initially pivoted open as shown in FIGS. 5 and 6, the free end 46 of the anti-backup pawl 42 is disengaged from the thumbwheel 38. Then, the connection 48 between the anti-backup pawl 42 and the remaining cover portion 24 is broken and torn apart and the connection 50 between the anti-backup pawl and the door cover portion is bent and twisted in order to incapacitate the anti-backup pawl. This occurs before the door cover portion 22 is opened wide enough to permit the film cartridge 20 to be removed from the cartridge receiving chamber 18. Of course, the connection 50 instead of the connection 48 can be torn apart when the door cover portion 22 is pivoted open.

A fracture line of weakness 52, preferably a v-shaped groove in the rear cover part 16, divides the door cover portion 22 and the remaining cover portion 24. The fracture line of weakness 52 substantially (i.e. largely, but not wholly) is not coincident (i.e. does not occupy the same space) with the pivot axis 30 in order to effect a shearing stress in addition to a bending stress at the fracture line of weakness, which causes the door cover portion 22 to break and separate along the fracture line of weakness from the remaining cover portion 24 when the door cover portion is pivoted open. See FIGS. 3 and 5–8 which shows the fracture line of weakness 52 longitudinally extending to the pivot axis 30 at opposite ends of the fracture line of weakness. The fracture line of weakness 52 extends at an acute angle 54 from the pivot axis 30 to a peak 56 which is a maximum distance 58 from the pivot axis and back to the pivot axis at an acute angle 60 in order that the break and separation along the fracture line of weakness begin at the peak when the door cover portion is pivoted open. This occurs before the door cover portion 22 is opened wide enough to permit the film cartridge 20 to be removed from the cartridge receiving chamber 18. A plurality of strengthening ribs 62 extend across the pivot axis 30 and not across the fracture line of weakness 52, and a plurality of border ribs 64 extend along opposite sides 66 and 68 of the fracture line of weakness and not along opposite sides 70 and 72 of the pivot axis, to prevent the break along the fracture line of weakness from also occurring along the pivot axis.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. cover door portion
24. remaining cover portion
26. lead-in notch
28. lead-in notch
30. pivot axis
32. slot
34. opposite end
36. opposite end
38. film winding thumbwheel
40. film spool
42. anti-backup pawl
44. free end
46. free end
48. connection
50. connection
52. fracture line of weakness
54. angle
56. peak
58. maximum distance
60. angle
62. strengthening ribs
64. border ribs
66. opposite side
68. opposite side
70. opposite side
72. opposite side

What is claimed is:

1. An opaque rear cover part for a one-time-use camera comprising a door cover portion and a remaining cover portion arranged to permit said door cover portion to be pivoted open relative to said remaining cover portion about a pivot axis, and a fracture line of weakness formed between said door cover portion and said remaining cover portion to create a break along said fracture line of weakness which permits said door cover potion to be separated from said remaining cover portion when said door cover portion is pivoted open, is characterized in that:

said fracture line of weakness is not coincident with said pivot axis except at opposite ends of said line of weakness in order to effect a shearing stress in addition to a bending stress at said fracture line of weakness, which causes said door cover portion to separate from said remaining cover portion when said door cover portion is pivoted open.

2. An opaque rear cover part for a one-time-use camera comprising a door cover portion and a remaining cover portion arranged to permit said door cover portion to be pivoted open relative to said remaining cover portion about a pivot axis, and a fracture line of weakness formed between said door cover portion and said remaining cover portion to create a break along said fracture line of weakness which permits said door cover portion to be separated from said remaining cover portion when said door cover portion is pivoted open, is characterized in that:

said fracture line of weakness extends at an angle from said pivot axis to a peak which is a maximum distance from said pivot axis and back to said pivot axis at an angle in order that the break along said fracture line of weakness begins at said peak when said door cover portion is pivoted open.

3. An opaque rear cover part as recited in claim 2, wherein a plurality of strengthening ribs extend across said pivot axis and not across said fracture line of weakness to prevent the break along said fracture line of weakness from also occurring along said pivot axis.

4. An opaque rear cover part as recited in claim 2, wherein a plurality of border ribs extend along opposite sides of said fracture line of weakness and not along opposite sides of said pivot axis to prevent the break along said fracture line of weakness from also occurring along said pivot axis.

5. An opaque rear cover part as recited in claim 2, wherein said fracture line of weakness has opposite ends that traverse said pivot axis.

6. A one-time-use camera comprising a main body part having a cartridge receiving chamber, a film cartridge in said chamber, an opaque rear cover part having a door cover portion and a remaining cover portion arranged to permit said door cover portion to be pivoted open from said chamber about a pivot axis, and a fracture line of weakness formed between said door cover portion and said remaining cover portion to create a break along said fracture line of weakness which permits said door cover portion to be separated from said remaining cover portion when said door cover portion is pivoted open, is characterized in that:

said fracture line of weakness extends at an angle from said pivot axis to a peak which is a maximum distance from said pivot axis and back to said pivot axis at an angle in order that the break along said fracture line of weakness begins at said peak when said door cover portion is pivoted open.

7. A one-time-use camera comprising a main body part having a cartridge receiving chamber, a film cartridge in said chamber, an opaque rear cover part having a door cover portion and a remaining cover portion arranged to permit said door cover portion to be pivoted open from said chamber about a pivot axis, and a fracture line of weakness formed between said door cover portion and said remaining cover portion to create a break along said fracture line of weakness which permits said door cover portion to be separated from said remaining cover portion when said door cover portion is pivoted open, is characterized in that:

said fracture line of weakness is not coincident with said pivot axis except at opposite ends of said line of weakness in order to effect a shearing stress in addition to a bending stress at said fracture line of weakness, which causes said door cover portion to separate from said remaining cover portion when said door cover portion is pivoted open.

8. A one-time-use camera as recited in claim 7, wherein said fracture line of weakness is constructed to cause said cover door portion to at least begin to separate from said remaining cover portion before said cover door portion is opened wide enough to permit said film cartridge to be removed from said chamber.

9. A method of opening a one-time-use camera provided with a main body part having a cartridge receiving chamber, a film cartridge in the chamber, an opaque rear cover part having a door cover portion and a remaining cover portion arranged to permit the door cover portion to be pivoted open from the chamber about a pivot axis, and a fracture line of weakness formed between the door cover portion and the remaining cover portion and extending at an angle from the pivot axis to a peak which is a maximum distance from the pivot axis and back to the pivot axis at an angle to create a break along the line of weakness beginning at the peak which permits the door cover portion to be separated from the remaining cover portion when the door cover portion is pivoted open, said method comprising the steps:

pivoting the door cover portion open; and
beginning the break along the fracture line of weakness at the peak when the door cover portion is pivoted open.

* * * * *